United States Patent Office 3,163,550
Patented Dec. 29, 1964

3,163,550
PRODUCTION OF COLOURED ARTIFICIAL THREADS
John Gurney Webb, Kenilworth, and Maurice Henry Priest, Exhall, Coventry, England, assignors to Courtaulds Limited, London, England, a British company
No Drawing. Filed Mar. 31, 1961, Ser. No. 99,698
Claims priority, application Great Britain, Apr. 7, 1960, 12,338/60; July 29, 1960, 26,428/60
7 Claims. (Cl. 106—165)

This invention relates to the production of coloured artificial threads, filaments, fibres, staple fibres and the like materials, hereinafter referred to generally as "threads," and is particularly concerned with the production of such threads from viscose.

In the production of coloured viscose rayon threads it is well-known to add a dye or pigment to the viscose before the spinning operation, and the threads so obtained are generally referred to as spun-dyed threads. It is also well-known to inject the dye or pigment in the form of a staple dispersion, for example in viscose, into the main stream of viscose as it is on its way to the spinning machine.

New ranges of dyestuffs have recently appeared on the market which contain reactive groups comprising cyanuryl chloride residues having one or two reactive chlorine atoms so that in carrying out the dyeing operation the dyestuff undergoes a reaction with the material of the thread. Examples of such reactive dyes are the Procion dyes marketed by Imperial Chemical Industries Limited (see the relevant British patent specifications Nos. 772-030; 774,925; 781,930; 785,120; 785,222; 797,946 and 798,121) and the Cibacron dyes marketed by Ciba; Procion and Cibacron are both registered trademarks.

The present invention provides a method of utilising such reactive dyes in the spin-dyeing of viscose.

In accordance with this invention the reactive dyestuff containing a cyanuryl chloride radical having one or two reactive chlorine atoms is first condensed with a polyhydric compound to form a coloured substrate which is mixed into viscose to form a coloured viscose from which threads are formed in the usual way.

Examples of suitable polyhydric compounds for use in this invention are soluble starch and beta-cellulose.

To form the substrate, the polyhydric compound may be dissolved in water, as for example when using starch, or finely dispersed in water, as for example when using beta-cellulose, the reactive dyestuff is then added and caused or allowed to react to form a coloured substrate. The reaction may proceed at room temperature and it may be expedited by heating and by adding an acid acceptor such as sodium carbonate or pyridine. The solution or dispersion so produced may be added direct to viscose in metered amounts to give the desired colour; alternatively the dyed polyhydric compound may be separated, after precipitation where necessary, and then redissolved or redispersed, for example in aqueous caustic soda solution ready for incorporation in viscose.

It is particularly advantageous in preparing the coloured substrate to condense the reactive dyestuff with the polyhydric compound in the presence of a viscose. The substrate thus formed comprises the condensation product of the dye and the polyhydric compound in a viscose and this may be injected into the spinning viscose, preferably after deaeration, to form the coloured threads.

All the coloured substrates may be injected into the main stream of viscose using the standard technique, preferably immediately before the formation of the threads. Threads obtained by the present invention are generally characterised by a bright lustre.

The invention is illustrated by the following examples in which parts and percentages are by weight.

Example 1

5.7 parts of Procion Brilliant Blue R (Colour Index Reactive Blue 4) were added to 200 parts of a 5 percent aqueous "soluble starch" solution and the mixture was stirred at room temperature until the dye had dissolved. After 15 minutes, 4 parts of sodium carbonate were stirred in and the solution was then allowed to stand for 3 hours at ordinary temperature; during this time fixation of the dye on the starch took place and the viscosity of the solution increased.

The solution was mixed with 2300 parts of normally aged viscose containing 7.6 percent of cellulose, and the mixture was de-aerated under vacuum for 5 hours and then extruded in the usual way but without a bleaching treatment to produce a bright blue 133 denier/27 filament thread which was finally washed in 0.2 percent soap solution to remove unfixed dye.

Example 2

200 parts of a 5 percent aqueous solution of soluble starch was prepared at 80° C. and heated for 3 hours at 80° C. with 5.7 parts of Procion Brilliant Blue H7GS (Colour Index Reactive Blue 4) and 4 parts of sodium carbonate. The resulting dyed starch was precipitated by adding excess acetone and filtered off. The precipitate was washed in acetone/water and methanol and was then dried.

The dry precipitate was then redissolved in 6 percent aqueous caustic soda solution and the solution was added to viscose which was spun as described in Example 1. In this case a final soaping was not necessary.

Example 3

6 parts of Procion Yellow R (Colour Index Reactive Yellow 4) were added to 100 parts of a fine 10 percent aqueous dispersion of beta-cellulose at room temperature and left for 15 minutes, after which time 6 parts of sodium carbonate were added. The dispersion was stirred periodically for 3 hours and then added to 2400 parts of viscose (7.6 percent of cellulose) with stirring. The dispersion was deaerated and extruded to form threads as described in Example 1; the dyed beta-cellulose dissolved in the viscose during the 5 hours' air evacuation.

Example 4

900 grams of a 5 percent solution of soluble starch dissolved in 6 percent aqueous caustic soda solution were added with constant stirring to 1.5 kg. of viscose containing 7.6 percent of cellulose. After 15 minutes 18.5 grams of Procion Brilliant Red 2B (Colour Index Reactive Red 1) dispersed in 50 ml. of water were added and stirring was continued for a further 30 minutes. The dyed starch-viscose solution was then placed under vacuum for 8 hours, diluted with 9.5 kg, of viscose which was ready for spinning and the mixture was spun into a thread of 170 denier/27 filaments. The processing of the thread was carried out on a continuous spinning machine and consisted in treatment with (a) 1 percent aqueous sulphuric acid at 60° C., a cold water wash, three successive soap treatments at 80° C. with a solution containing 2 grams/litre of soap, two cold water washes and finally a finishing bath.

Example 5

750 grams of soluble starch were dissolved in 14 kg. of 6 percent aqueous caustic soda colution and the solution was then added to 5 kg. of viscose containing 7.6 percent of cellulose. 340 grams of Procion Red G (Colour Index Reactive Red 5) dispersed in 1 kg. of water were then added with constant stirring which was continued for 30 minutes. The dyed starch-viscose solution was then placed under vacuum for 8 hours and spun into a yarn using a ratio of undyed viscose to dyed substrate of 11.25 to 1. The filaments produced were processed on a continuous spinning machine as follows: (a) 1 percent aqueous sulphuric acid at 60° C., cold water wash, 0.5 percent aqueous sodium sulphide solution at 60° C., cold water wash, 0.2 percent aqueous hydrochloric acid solution at 20° C., cold water wash, aqueous solution containing 2 grams/litre of Lissapol NX at 80° C. (Lissapol is a registered trademark), cold water wash and finally a soft finish.

The procedure described in the specification of British application No. 12,338/60 and in the present specification is equally applicable to the production of coloured filaments of regenerated cellulose in which the viscose containing the coloured substrate is extruded through a slot.

What we claim is:

1. A process for the manufacture of coloured viscose rayon filaments, comprising the steps of condensing a reactive dyestuff containing a cyanuryl chloride residue having from 1 to 2 reactive chlorine atoms, with a polyhydric compound chosen from the group consisting of soluble starch and beta-cellulose to form a coloured substrate, adding the coloured substrate to a viscose to form a mixture and forming the mixture into filaments.

2. A process as claimed in claim 1 in which the step of condensing the dyestuff and the polyhydric compound is conducted in an aqueous medium.

3. A process as claimed in claim 1 in which the step of condensing the dyestuff and polyhydric compound is conducted in an aqueous solution of an acid acceptor.

4. A process as claimed in claim 1 in which the step of condensing the dyestuff and the polyhydric compound is conducted in a viscose solution.

5. A process as claimed in claim 1 in which the coloured substrate is mixed with aqueous caustic soda for adding to the viscose.

6. A process as claimed in claim 1 in which the step of adding the coloured substrate to the viscose is carried out by injecting the coloured substrate into a main stream of spinning viscose immediately before forming the mixture into filaments.

7. A coloured viscose rayon filament consisting essentially of regenerated cellulose, and a condensation product of a reactive dyestuff containing a cyanuryl chloride residue having from 1 to 2 reactive chlorine atoms, with a polyhydric compound chosen from the group consisting of soluble starch and beta-cellulose.

References Cited in the file of this patent

UNITED STATES PATENTS

| | | |
|---|---|---|
| 2,783,158 | Entwhistle et al. | Feb. 26, 1957 |
| 2,927,035 | Wegmann et al. | Mar. 1, 1960 |

FOREIGN PATENTS

| | | |
|---|---|---|
| 781,930 | Great Britain | Aug. 28, 1957 |
| 785,222 | Great Britain | Oct. 23, 1957 |